(12) United States Patent  
Lubianiker

(10) Patent No.: US 8,508,098 B2  
(45) Date of Patent: Aug. 13, 2013

(54) GIMBALED SCANNING MICRO-MIRROR ACTUATION SCHEME AND ARCHITECTURE

(75) Inventor: Yoram Lubianiker, Tel-Aviv (IL)

(73) Assignee: Maradin Technologies Ltd., Yoqneam (IL)

( * ) Notice: Subject to any disclaimer, the term of this patent is extended or adjusted under 35 U.S.C. 154(b) by 956 days.

(21) Appl. No.: 12/517,449

(22) PCT Filed: Apr. 10, 2007

(86) PCT No.: PCT/IL2007/000436  
§ 371 (c)(1),  
(2), (4) Date: Jun. 3, 2009

(87) PCT Pub. No.: WO2008/068735  
PCT Pub. Date: Jun. 12, 2008

(65) Prior Publication Data  
US 2010/0020379 A1    Jan. 28, 2010

Related U.S. Application Data

(60) Provisional application No. 60/868,340, filed on Dec. 3, 2006.

(51) Int. Cl.  
*G02B 26/08* (2006.01)

(52) U.S. Cl.  
USPC ............... 310/309; 359/224.1; 359/200.6; 359/200.7

(58) Field of Classification Search  
USPC ............................................ 310/309  
See application file for complete search history.

(56) References Cited

U.S. PATENT DOCUMENTS

| | | | |
|---|---|---|---|
| 4,003,626 A | 1/1977 | Reinke et al. | |
| 6,044,705 A | 4/2000 | Neukermans et al. | |
| 6,140,979 A | 10/2000 | Gerhard et al. | |
| 6,181,460 B1* | 1/2001 | Tran et al. | 359/291 |
| 6,295,154 B1* | 9/2001 | Laor et al. | 359/223.1 |
| 6,480,320 B2 | 11/2002 | Nasiri | |
| 6,595,055 B1 | 7/2003 | Schenk et al. | |
| 6,744,173 B2* | 6/2004 | Behin et al. | 310/309 |
| 6,760,144 B2 | 7/2004 | Hill et al. | |
| 7,071,594 B1 | 7/2006 | Yan et al. | |
| 2003/0019832 A1* | 1/2003 | Conant et al. | 216/2 |
| 2004/0004749 A1 | 1/2004 | Orcutt et al. | |
| 2004/0136041 A1* | 7/2004 | Togino | 359/196 |
| 2004/0207744 A1 | 10/2004 | Bock | |

(Continued)

FOREIGN PATENT DOCUMENTS

WO    WO2006051544    5/2006

OTHER PUBLICATIONS

Wolter A. et al., "Improved layout for a resonant 2D micro-scanning mirror with low operation voltages"; Proc. SPIE vol. 4985, pp. 72-82, (2003).

(Continued)

*Primary Examiner* — Burton Mullins  
(74) *Attorney, Agent, or Firm* — Occhiuti Rohliceck & Tsao LLP

(57) ABSTRACT

A Micro-Electro-Mechanical Systems (MEMS) device for actuating a gimbaled element, the device comprising a symmetric electromagnetic actuator for actuating one degree of freedom (DOF) and a symmetric electrostatic actuator for actuating the second DOF.

30 Claims, 9 Drawing Sheets

(56) References Cited

U.S. PATENT DOCUMENTS

| | | | |
|---|---|---|---|
| 2004/0223195 A1 | 11/2004 | Nomura | |
| 2005/0078345 A1* | 4/2005 | Turner et al. | 359/224 |
| 2005/0082252 A1* | 4/2005 | Nasiri et al. | 216/2 |
| 2005/0128609 A1* | 6/2005 | Shimada et al. | 359/849 |
| 2005/0243446 A1 | 11/2005 | Wood | |
| 2008/0055815 A1 | 3/2008 | Rottenberg | |
| 2008/0094682 A1 | 4/2008 | Greywall et al. | |
| 2008/0197748 A1 | 8/2008 | Naftali et al. | |
| 2009/0058562 A1 | 3/2009 | Joodaki | |
| 2010/0020379 A1* | 1/2010 | Lubianiker | 359/224.1 |
| 2011/0228367 A1* | 9/2011 | Lubianiker et al. | 359/199.2 |

OTHER PUBLICATIONS

Sprague et al., "Bi-axial magnetic drive for scanned beam display mirrors", Proc. of SPIE vol. 5721; pp. 1-13, (2005).

Ji et al., "Dual-axis electro-magnetic scanning micromirror using radial magnetic field", presented at MEMS '06, Istanbul, Turkey (2006).

Kwon et al., "Vertical comb-drive based 2-D gimbaled micromirrors with large static rotation by backside island isolation"; J. Selected topics in quantum elec., vol. 10(3), pp. 498-504 (2004).

Leus et al., "Fringing field effect in electrostatic actuators", ETR-2004-2, 2004 (a technical document associates with the technion, Haifa, Israel).

Hakan et al., "Optical performance requirements for MEMS-scanner based micro displays", SPIE vol. 4178, p. 176-185 (2000).

Muhlshtein et al., "High cycle fatigue of single crystal si thin films"; JMEMS vol. 10, Dec. 2001.

http://www.Hyperphysics.phy-astr.gsu.ed.

Hecht, Eugene "Optics," $3^{rd}$ ed., Addison Wesley (1998).

Jenkins et al., "Fundamentals of Optics," $4^{th}$ ed., McGraw-Hill (1976).

Kingslake et al., "Applied Optics and Optical Engineering," Academic Press (1965).

Ray, Sidney F., "Applied Photographic Optics," $2^{nd}$ ed., Focal Press (1997).

Timoshenko et al., "Theory of Elasticity," $3^{rd}$ ed., McGraw-Hill International (1970).

\* cited by examiner

GIMBALED SCANNING MICRO-MIRROR ACTUATION SCHEME AND ARCHITECTURE

FIELD OF THE INVENTION

The present invention related to the field of micro-electromechanical systems (MEMS) electromagnetic and electrostatic actuators and more particularly the present invention relates to actuation schemes and architectures for scanning micro-mirror devices placed on a gimbaled element with a symmetric internal electro-static actuator and a symmetric external electro-magnetic actuator.

BACKGROUND OF THE INVENTION AND PRIOR ART

Many MEMS applications require tilting motion of reflecting surfaces (i.e., micro-mirrors). In particular, there are applications with the need for tilting motions in two directions simultaneously, i.e., a mechanism having two degrees-of-freedom (DOF). One of such application is a scanning micro-mirror device for the use of displaying images.

Micro-mirrors offer numerous advantages in realizing optical scanning systems. Their small size, low cost and low power consumption provide a compelling solution for image creation and display systems. However, current state-of-the-art design still fall short on achieving the required performance (i.e., resolution, scan range, repeatability, scan linearity and power) which is required to making micro-mirrors based displays competitive to other display technologies.

The actuation of micro-mirrors in two DOF is essential for the functionality of the device. One way to implement actuation of an element in two DOF is with two different elements, each of which moves simultaneously in orthogonal directions. One way to implement actuation of an element in two DOF is by actuating a single gimbaled element having two DOF. The preferred architecture for micro-mirror scanners is the gimbaled design, where a single mirror is manipulated across two DOF. This architecture utilizes only one mirror for the two dimensional scan, thus reducing the chip size and simplifying the optical system design. The mirror is manipulated across both axes by using an actuation mechanism. The scan across one axis (horizontal axis) is done at a relative high frequency, typically a few KHz, while the scan across the second axis (vertical axis) is done at a relative lower frequency, typically a few tens of Hz.

Actuation Mechanisms

The prevalent actuation mechanisms are:
a) Electrostatic, where capacitance change induces an electrostatic force to move the mirror about an axis. Typically, comb drive actuators are used to create this movement.
b) Electromagnetic, where alternating current in a magnetic field induces a magnetic force to move the mirror. Most commonly, the mirror has current carrying coils, and is positioned inside a magnetic flux created by fixed magnets which are placed beside the mirror and coil unit.
c) Piezoelectric, where a piezoelectric material is used to translate voltage into mechanical force and consequently, mirror movement.

Electrostatic Mechanisms

Reference is made to FIG. 2 (Prior art), which illustrates a typical prior art electrostatic actuation mechanism 100. A mirror 110 is affixed to moving element 120 (rotor) having an axis 122. Two electrodes 130 (stator) are place below each end of element 120 and when a different electrical potential is introduced between element 120 and an electrode 130a, a force F is created, attracting element 120 to electrode 130a, thereby creating a movement of element 120 about axis 122. When movement is required in the opposite direction, an electrical potential different is introduced between element 120 and the other electrode 130b. The electrostatic actuation mechanism 100 also creates some force f on axis 122, which typically, in MEMS technology, is flexible, and thus creating an unwarranted movement of axis 122 in the direction of force f. The unwarranted movement of axis 122 is a result of the electrostatic actuator 100 being non-symmetric. Furthermore, the usage of electrostatic actuators 100 in two DOF introduces more problems. Typically, micro-mirrors 110 are designed to operate at their resonant frequency (i.e. the frequency at which the mechanical structure oscillates). However, the scan linearity and repeatability in display applications is greatly affected, which causes pixel and thereby image blurring and distortion. Moreover, in most of the prior art work, a single actuator is used to excite motion in both scanning axes. As a result, there is a mechanical coupling of the two DOF (i.e., actuation of one DOF also induces some residual actuation force on the other DOF), which directly affects the scan linearity and the image sharpness and reduces the elements operation quality and efficiency. Various solutions have been proposed to this problem; however none provides a suitable solution to the problem of attaining a linear scan at low power consumption. U.S. patent application 2004223195, by Nomura, is an example of a gimbaled mechanism with two DOF using electrostatic actuators.

Electromagnetic Mechanisms

Reference is made to FIG. 3 (Prior art), which illustrates a typical prior art electromagnetic actuation mechanism 200, including a magnet 210 and an element 220 having an axis 222 is wound with a coil 224. When a DC electric current is introduced into coil 224, a repelling/attracting force 226 is induced relatively to the magnetic field of static magnets 210 and the DC electric current, thereby creating a movement of element 220 about axis 222 in the direction of the repelling/attracting force 226. When movement is required in the opposite direction, the polarity of the alternating electric current is introduced into coil 224 is changed, thereby inducing force in the opposite direction.

The main advantage of the electromagnetic actuation is the high force density, resulting in a device that can operate in protective environment without the need for vacuum. However, it is not trivial to use electromagnetic actuation for inner gimbaled moving elements. Therefore, it is prevalent to use electrostatic actuation for the above. Although a method that can simultaneously actuate a gimbaled element in two DOF, while using two different actuators, is more robust and less sensitive to mechanical coupling, but is not trivial for implementation.

Symmetric Electrostatic Mechanisms

To overcome the asymmetry of electrostatic actuation mechanism 100, a different electrostatic actuation mechanism was introduced in U.S. Pat. No. 6,595,055 (U.S. '055), given to Schenk et al. U.S. '055 provided a scissors-like mechanism that introduced an electrostatic actuation mechanism with a pure torque applied to the axis of movement of the rotor, not giving raise to unwarranted force on the axis of rotation.

Reference is made to FIG. 4 (Prior art), which illustrates a symmetric prior art electrostatic actuation, with scissors-like mechanism 150. A mirror 160 is affixed to moving element 170 (rotor) having an axis 172. Electrostatic actuation mechanism 150 also includes a stator element 180, whereas there is some angle $\theta_0$ between stator 180 and rotor 170, when there is no electrical potential different between stator 180 and rotor 170, i.e. $V_1(t)=V_2(t)$. When a difference in electrical potential is introduced between stator 180 and rotor 170, a force F is created, attracting rotor 170 to stator 180, thereby creating a movement of rotor 170 about axis 172. In this embodiment no residual forces are applied to axis 172. However the mechanism introduced by U.S. '055 has manufacturing difficulty as both stator 180 and rotor 170 are created from the same layer of silicon, which raises the problem of applying $V_1(t) \neq V_2(t)$ in the same layer of Silicon. U.S. '055 provides a solution, which is difficult to manufacture, where the stator layer includes two additional sub-layers: an insulating sub-layer and a metal layer to which $V_1(t)$ is applied.

Feedback Control

A critical parameter in micro-mirror design is the attainable scan angle, which determines the optical system design and resulting size of the display. One of the main limitations in all actuation mechanisms is the maximum attainable scan angle since current or voltage, at the micro-mirror are limited.

To provide repeatability and linearity, a feedback mechanism is incorporated in the mirror design. The feedback mechanism however is susceptible to interference from the drive signals which are typically orders of magnitude stronger. Furthermore, the feedback control of existing scanners falls short of the required linearity and repeatability and typically sense one DOF.

Conclusion

Thus, there is a need for and it would be advantageous for applications using micro-mirrors architecture to have a system that can meet one or more of the following challenges:

a) Eliminating the coupling/interference/crosstalk between the two axes of motion;

b) Achieving low drive power while maintaining a linear and repeatable scan;

c) Increasing available drive force to increase scan angle:

d) Improving the feedback sensors to increase the resolution; and/or e) Optimizing feedback algorithms to provide the required repeatability and linearity.

The invention described henceforth, presents a new paradigm in actuation schemes and architecture of gimbaled elements, which eliminates the mechanical coupling of the two DOFs. This invention enables a simple implementation and sufficient power for high quality performances typically required in such devices.

BRIEF SUMMARY OF THE INVENTION

The term "gimbaled element" as used herein refers to an element with two angular degrees of freedom, capable of moving about two axes simultaneously, the angles rotating about axes which are substantially mutually orthogonal and coplanar. Reference is made to FIG. 1 (Prior art), which illustrates a gimbaled element 10. Gimbaled element 10 includes an inner element 30 that can rotate about axis 32 and outer element 20 that can rotate about axis 22, whereas the two axes 22 and 32 provide gimbaled element 10 the two DOF.

According to the present invention there is provided a micro-electro-mechanical system (MEMS) device for actuating a gimbaled element. The MEMS device includes an electromagnetic actuator for actuating a first angular degree of freedom (DOF) of rotation about the vertical axis; and an electrostatic actuator for actuating the second angular DOF of rotation about the horizontal axis, wherein the horizontal axis and the vertical axis are orthogonal and coplanar. The electromagnetic actuator has a symmetric structure, thereby actuating forces produced by the electromagnetic actuator, create only a rotational movement of the first DOF, about the horizontal axis. The electromagnetic actuator excites only negligible residual actuation force on the second DOF. The electrostatic actuator uses electrostatic fringing fields, thereby creating an actuation force, and since the electrostatic actuator has a symmetric structure, the actuating forces create only a rotational movement of the second DOF about the vertical axis. The electrostatic actuator excites only negligible residual actuation force on the first DOF. Both the rotor and the stator of the electrostatic actuator are created from the same layer and there is no electrical potential difference between both sides of the layer of the electrostatic actuator.

The electrostatic actuator actuates the second degree of freedom in the horizontal scan direction and the electromagnetic actuator, actuates the first degree of freedom in the vertical scan direction. The electromagnetic actuator includes external fixed electromagnet coils and internal rotating magnets, wherein the rotating magnets are affixed to said horizontal axis and actuated by the electromagnet coils. One or more electromagnetic actuators can be used on each side of the horizontal axis.

In embodiments of the present invention the electrostatic actuator include a frequency sensor with high signal to noise ratio.

The MEMS device of the present invention is preferably manufactured using a 4-masks Silicon-On-Insulator (SOI) fabrication process.

BRIEF DESCRIPTION OF THE DRAWINGS

The present invention will become fully understood from the detailed description given herein below and the accompanying drawings, which are given by way of illustration and example only and thus not limitative of the present invention.

DETAILED DESCRIPTION OF THE INVENTION

Figure 1:
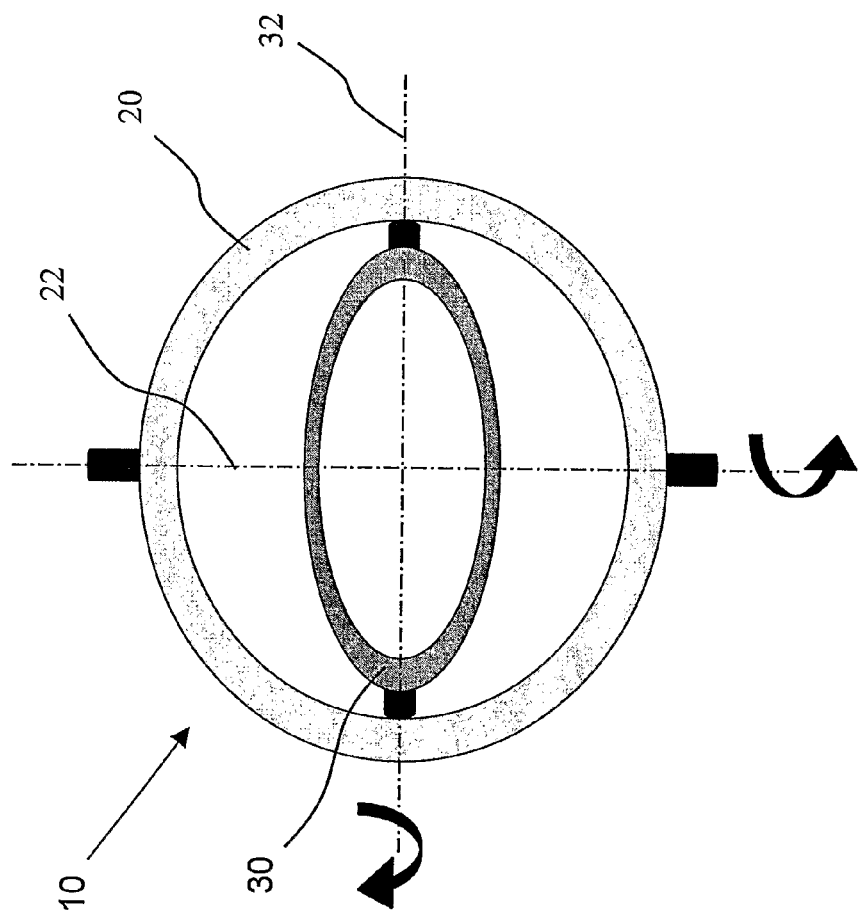
FIG. 1 (Prior art) illustrates a gimbaled element with two degrees of freedom.
Figure 2:
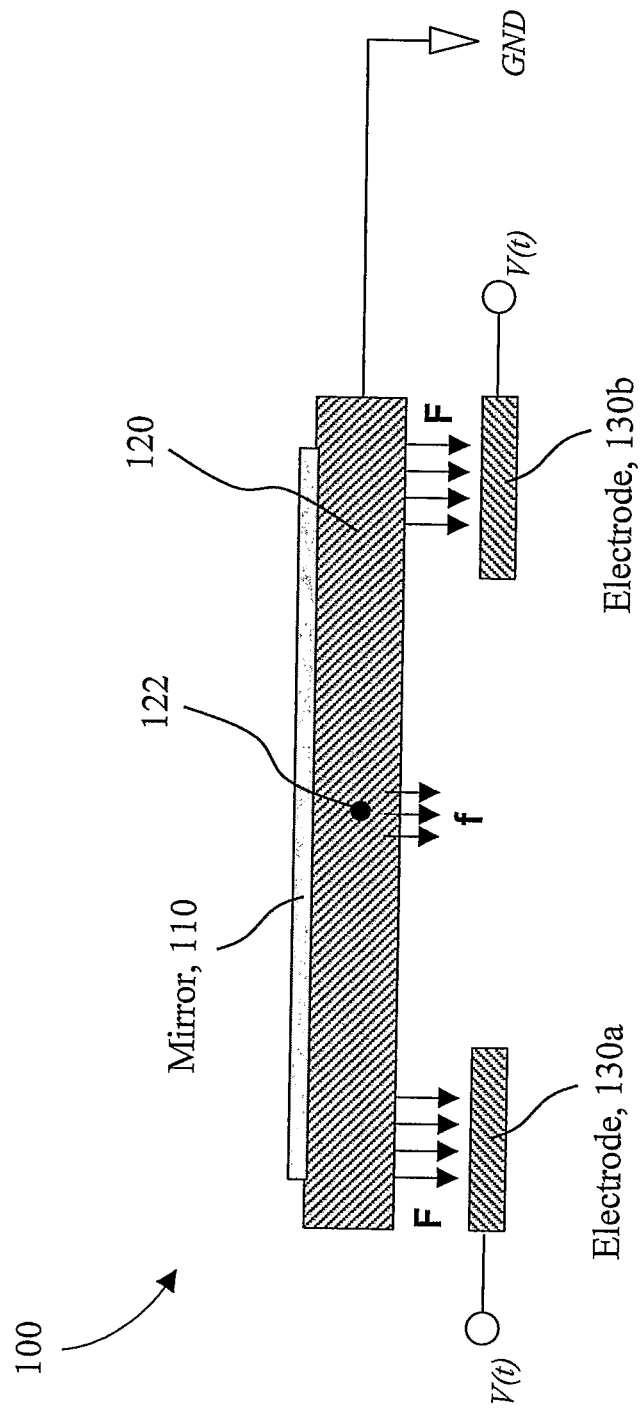
FIG. 2 (Prior art) illustrates a typical prior art electrostatic actuation mechanism.
Figure 3:
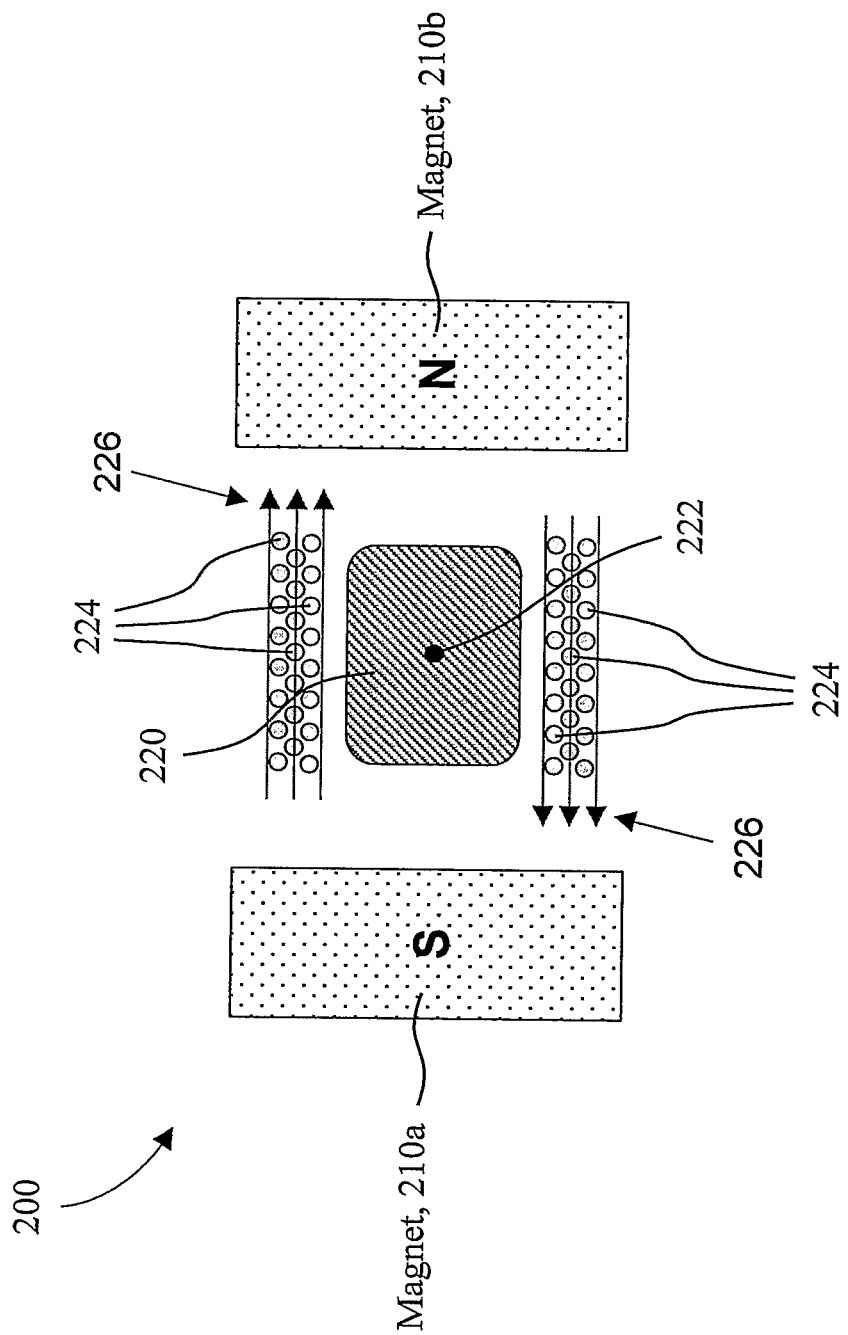
FIG. 3 (Prior art) illustrates a typical prior art electromagnetic actuation mechanism.
Figure 4:
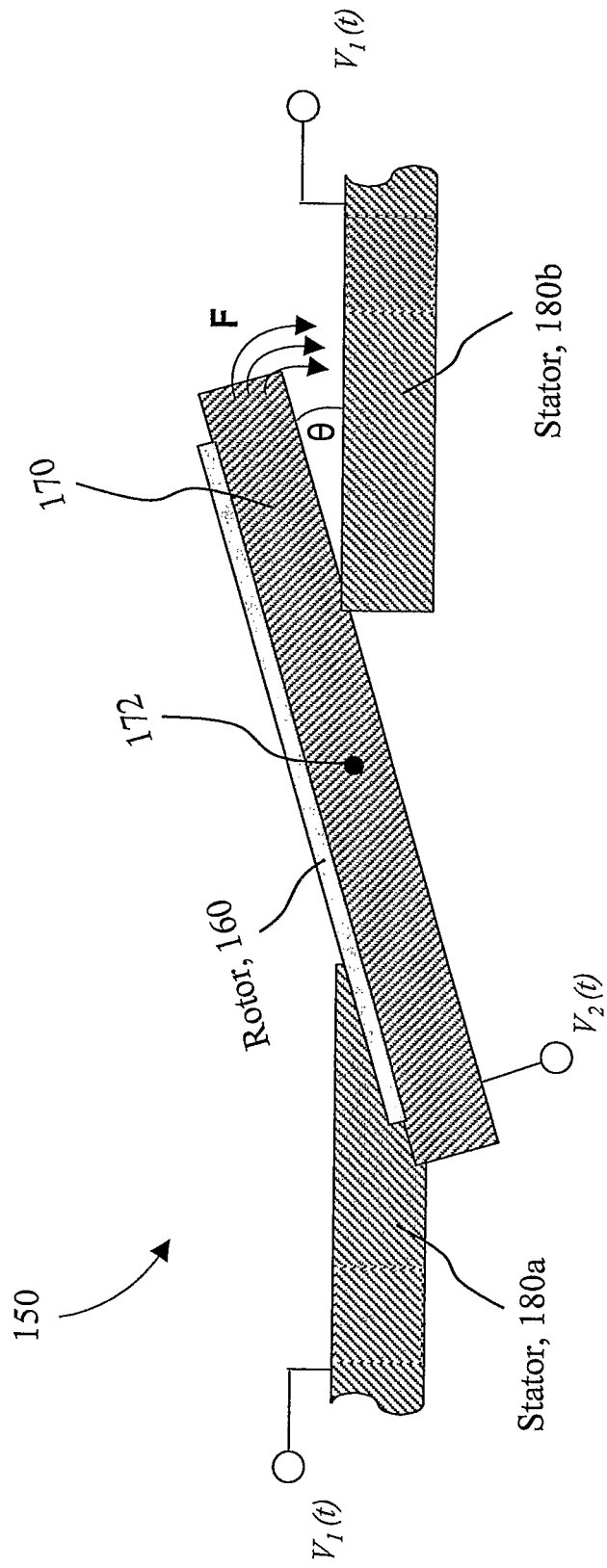
FIG. 4 (Prior art) illustrates a symmetric prior art electrostatic actuation, with scissors-like mechanism.

The present invention is of a MEMS actuation scheme and architectures for scanning micro-mirror devices placed on a gimbaled element with a symmetric internal electro-static actuator and a symmetric external electromagnetic actuator. The external electromagnets for inducing magnetic flux are static, having the fixed magnets deposited on the mirror itself. The present invention actuator design enables a planar assembly of the micro-mirror and electromagnet and there are no mechanical limitations on the travel of the mirror. Furthermore, the gimbaled element of the present invention provides better electromagnetic conversion efficiency with no power limits. This innovative architecture of external electromagnets enables to implement a very powerful actuator which is symmetric to the scanner vertical rotation axis. Excitation of secondary DOF and image blurring are eliminated. The innovative architecture and design of the gimbaled element enables a standard 4-masks Silicon-On-Insulator (SOI) fabrication process.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 5:
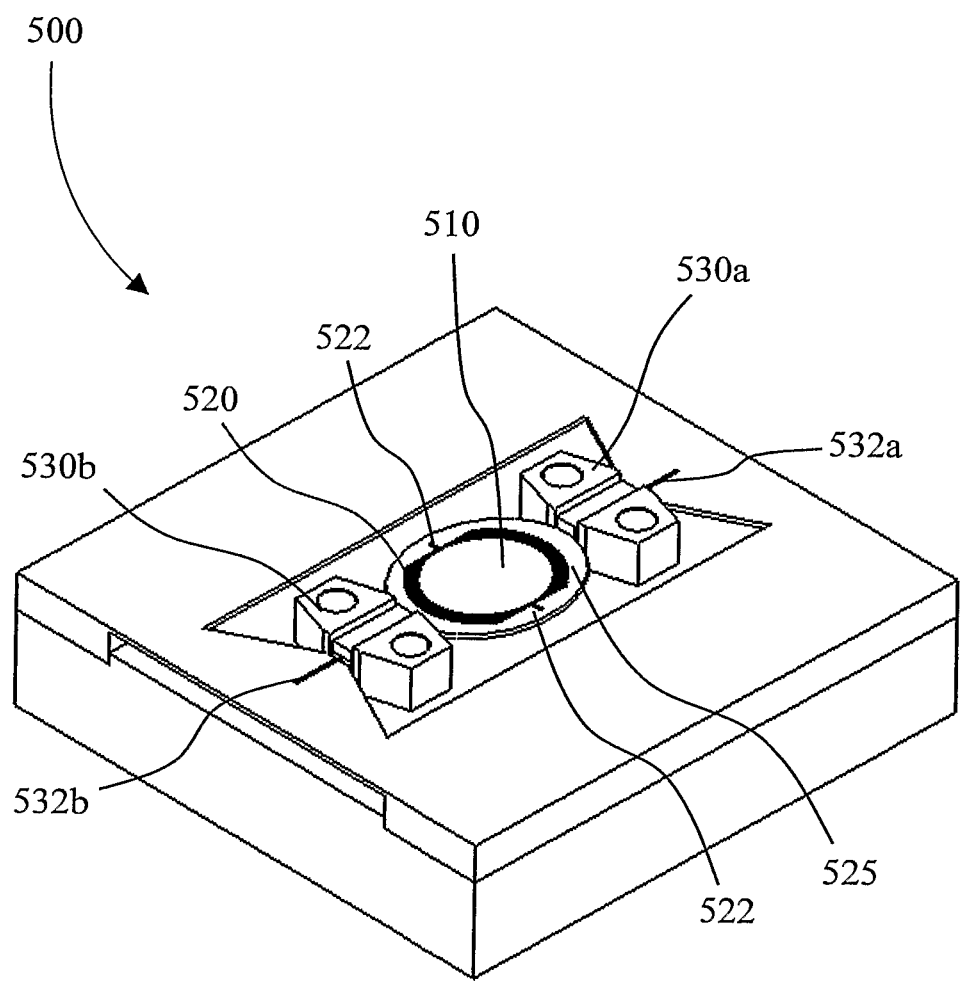
FIG. 5 is a top perspective view illustration of a gimbaled subsystem, according to embodiments of the present invention.
Figure 6:
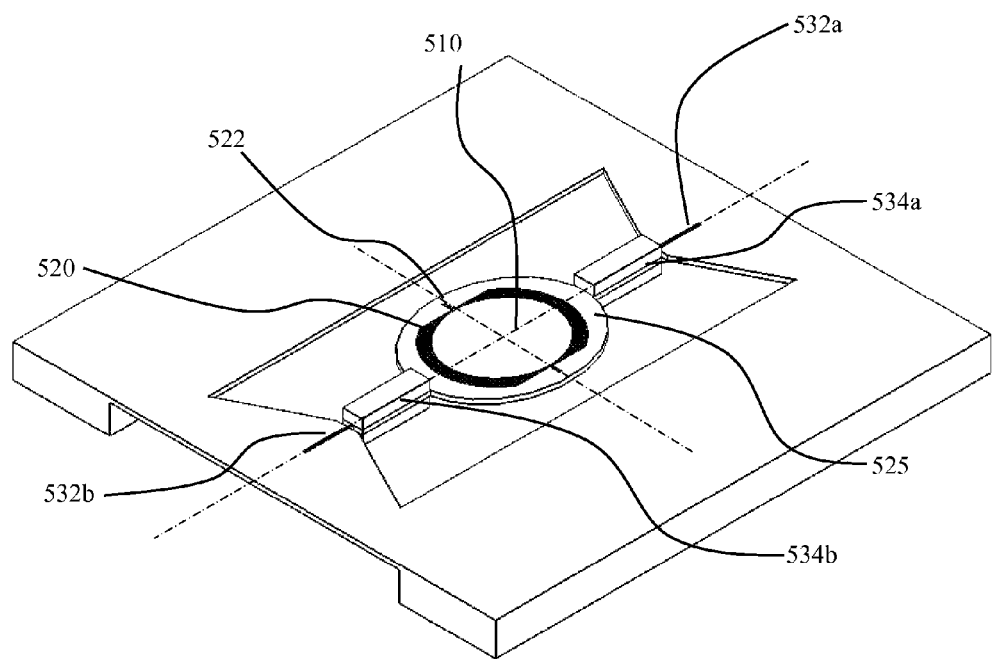
FIG. 6 is a top perspective view illustration of the gimbaled elements (the mirror and annular element with the $2^{nd}$ degree of freedom) of a gimbaled subsystem, according to embodiments of the present invention

Referring now to the drawings, FIG. 5 is a top perspective view illustration of a gimbaled subsystem 500, and FIG. 6 is a top perspective view illustration of the gimbaled elements (inner element with mirror 510 and external annular element 525) of a gimbaled subsystem 500 according to embodiments of the present invention. Gimbaled subsystem 500 includes a mirror 510 generally internal and at the center; mirror 510 is mounted on an element which serves as the rotor of the electrostatic actuator 520 that moves mirror 510 about axis 522. Gimbaled subsystem 500 also includes annular element 525, which also serves as the stator of electrostatic actuator 520, can move about axis 532, and is actuated by electromagnetic actuators 530, that are positioned on axis 532. Magnets 534 of electromagnetic actuators 530 are positioned adjacent to axis 532, and electromagnets 536 are positioned outside of magnets 534. Magnets 534 have a polarity (north-south) in the vertical direction.

The Electromagnetic Mechanisms

Figure 7:
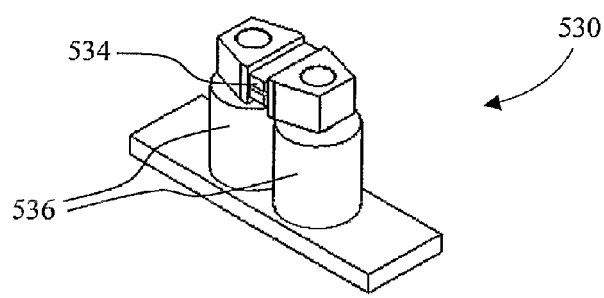
FIG. 7 is a schematic top perspective view of an electromagnetic actuator of a gimbaled subsystem, according to embodiments of the present invention.

Referring now made to FIG. 7, which is a schematic top perspective view of electromagnetic actuator 530 of gimbaled subsystem 500, according to embodiments of the present invention. FIG. 7 schematically illustrates electromagnetic actuator 530 which includes internal magnets 534 rotating about axis 532 and fixed external electromagnets 536. Rotating magnets 534 are also shown in FIG. 7 where magnet 534a is attached symmetrically outside axis 532a and magnet 534b is positioned symmetrically outside axis 532b. It should be noted that one electromagnetic actuator 530 is enough to actuate gimbaled subsystem 500, and that more than one electromagnetic actuator 530 can be placed on each side of axis 532. Electromagnetic actuator 530 has a symmetrical structure and hence the actuating force produced, creates only a rotational movement of annular element 525 about axis 532, with no excitation of the inner element with mirror 510. Electromagnetic actuator 530 applies no unwarranted forces on axis 532, which typically, in MEMS technology, is flexible. Due to the symmetrical structure and lack of unwarranted forces on axis 532, electromagnetic actuator 530 provides a linear electromechanical response.

When DC electric current is introduced into the coils of electromagnets 536, magnetic flux is formed, thereby creating a repelling/attracting force rotating magnets 534 which is attached to axis 532, and thereby creating a rotational movement of annular element 525 about axis 532, in the direction of the repelling/attracting force. When movement is required in the opposite direction, the polarity of the DC electric current is introduced into the coils of electromagnets 536 is changed, thereby creating magnetic flux in the opposite direction. Electromagnet actuator 530 actuates outer, annular element 525 of gimbaled subsystem 500, providing the scan across the vertical axis, which is done at a relative low frequency, typically a few tens of Hz.

The design of electromagnetic actuator 530 enables a planar assembly of micro-mirror 510 and electromagnet 530. The design does not suffer from mechanical limitations on the travel of the mirror and provides good electromagnetic conversion efficiency with no power limits.

The Electrostatic Mechanisms

The present invention overcomes the complexity of the implementation of electrostatic actuation of dual-gimbaled scanners, with a unique design based on a standard 4-masks SOI fabrication process. The architecture uses a symmetric structure and a novel grounding scheme. The grounding scheme (as described in FIGS. 8a and 8b) enables to apply the same electric potential on all the structural matter of the device, thus simplifies significantly the implementation of the actuator. The structure provides highly dense actuation forces in a relatively small chip area, and the symmetry of the actuator 520 ensures no mechanical coupling between the two axes.

Figure 8A:
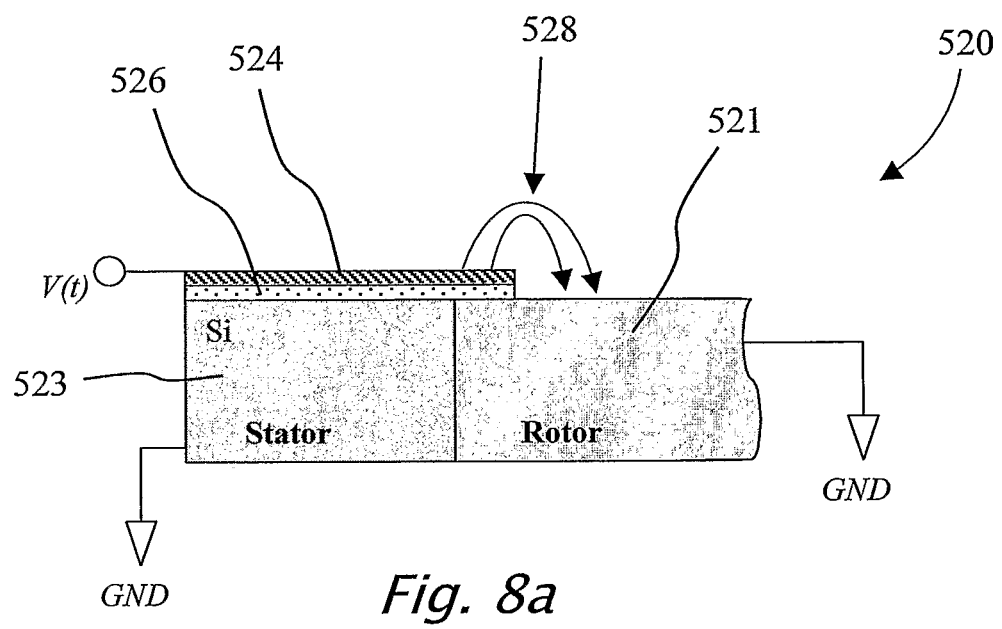
FIG. 8*a* is a schematic front view of an electrostatic actuator of a gimbaled subsystem, according to embodiments of the present invention.
Figure 8B:
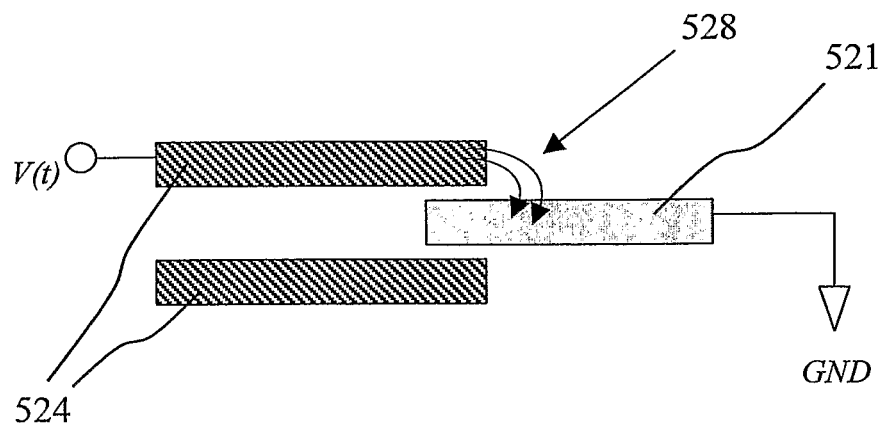
FIG. 8*b* is a schematic top view of the electrostatic actuator shown in FIG. 8*a*.
Figure 10:
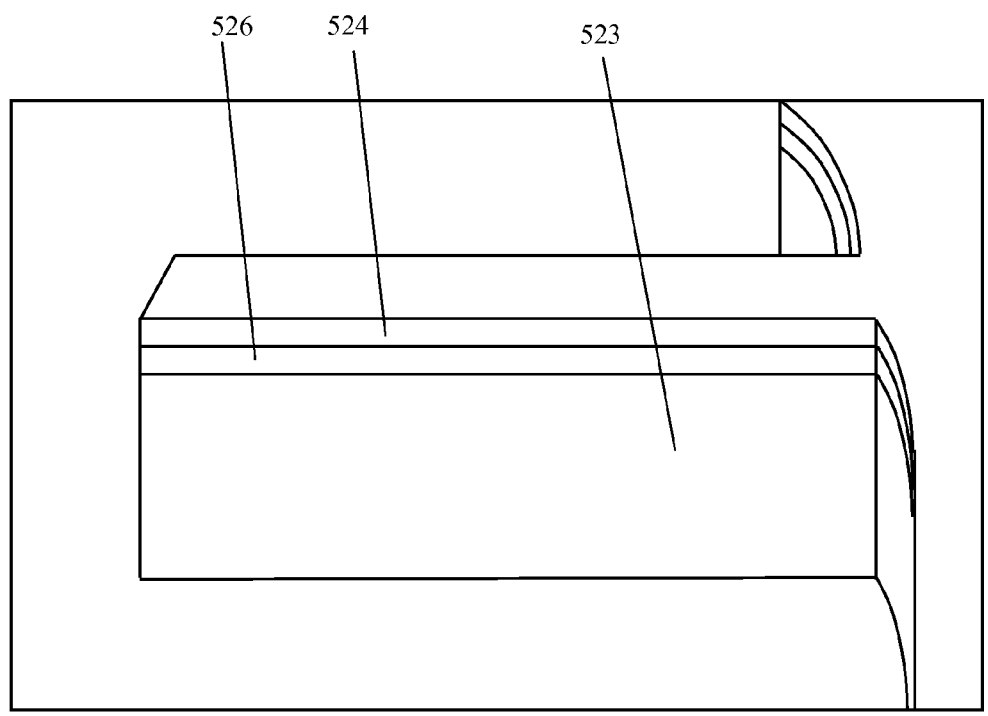
FIG. 10 depicts a side view of an electronic scanned image of a tooth of the rotor of an electrostatic actuator, according to embodiments of the present invention.

Referring now made to FIGS. 8a and 8b. FIG. 8a is a schematic front view of a comb like structured electrostatic actuator 520 of a gimbaled subsystem 500, according to embodiments of the present invention, and FIG. 8b is a schematic top view of the electrostatic actuator 520 shown in FIG. 8a. The actuation scheme utilizes fringing fields of electrostatic force fields 528 between an electrode 524, placed on top of stator 523, and rotor 521. Both stator 523 and rotor 521 are in the same electric potential and manufactured from the same Si layer in the same process. Reference is also made to FIG. 10, which is a side view of an electronic scanned image of a tooth of stator 523 of an electrostatic actuator 520, according to embodiments of the present invention. The stator 523 tooth is made of Si and has a thin layer of insulator 526 and then a thin metal layer 524. When an electric potential difference is introduce between the Si layer of rotor 521 and the thin metal layer 524 of stator 523, a force 528 created from the fringing electrostatic fields causes rotor 521 to rotate about rotor 521 axis.

Figure 9:
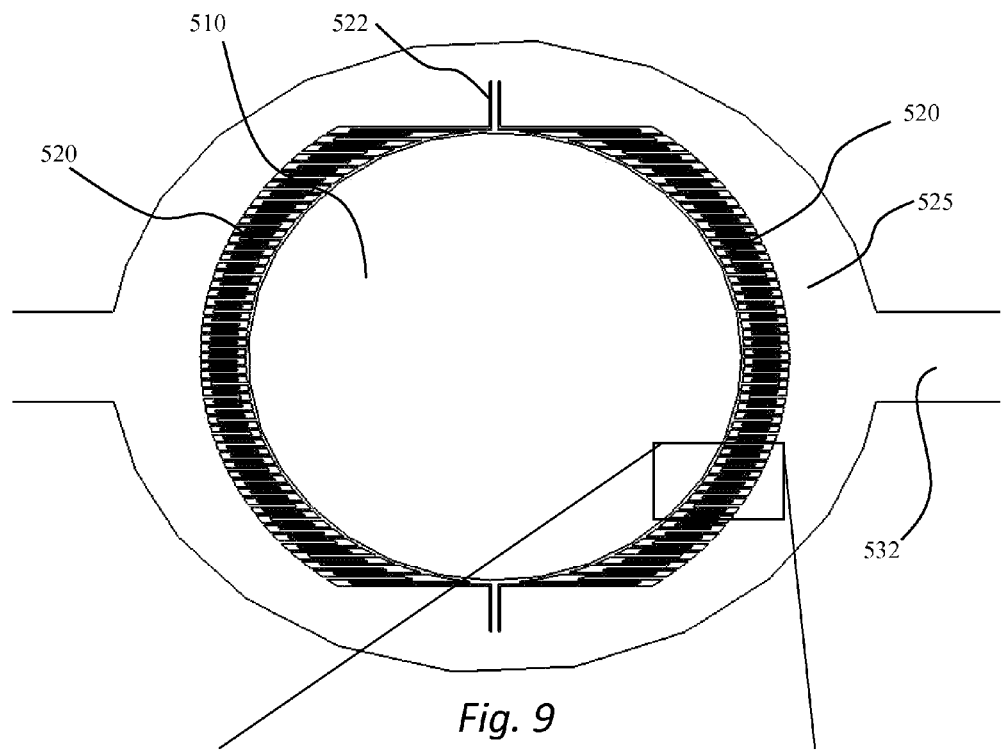
FIG. 9 depicts a top view of the electrostatic actuator of a gimbaled subsystem, according to embodiments of the present invention.
Figure 9A:
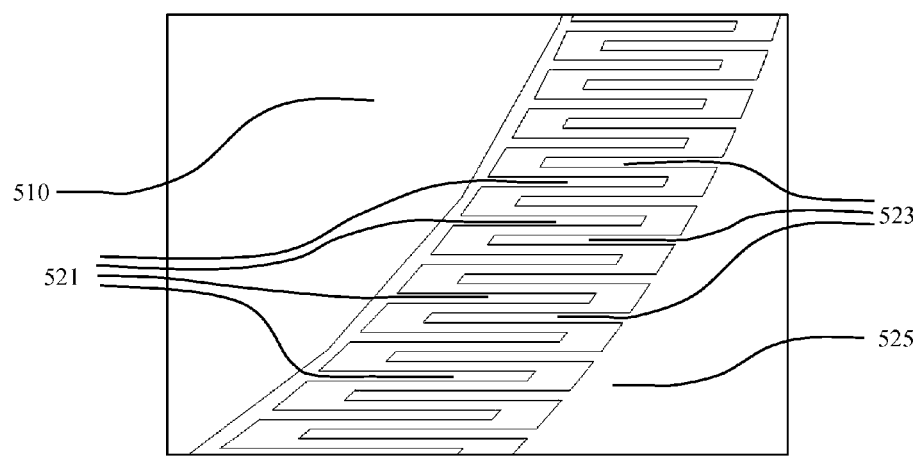
FIG. 9*a* is an enlargement of a portion of the electrostatic actuator shown in FIG. 9.

Reference is also made to FIG. 9, which depicts a top view of the electrostatic actuator 520 of a gimbaled subsystem 500, according to embodiments of the present invention, and FIG. 9a, which is an enlargement of a portion of the electrostatic actuator 520 shown in FIG. 9. The comb structure of electrostatic actuator 520 can be observed, including the multiple teeth of rotor 521 and respective multiple teeth of stator 523. The multiple teeth of rotor 521 are affixed to the inner element of gimbaled subsystem 500 with mirror 510, and the multiple teeth of stator 523 are affixed to external annular element 525. Hence, electrostatic actuator 520 actuates inner element of gimbaled subsystem 500, providing the scan across the horizontal axis, which is done at a relative high frequency, typically a few KHz.

Electrostatic actuator 520 has a symmetrical structure and hence the actuating force produced, creates only a rotational movement of inner element with mirror 510 about axis 522, with no excitation of annular element 525 about axis 532. Electrostatic actuator 520 applies no unwarranted forces on axis 522, which typically, in MEMS technology, is flexible. Due to the symmetrical structure and lack of unwarranted forces on axis 522, electrostatic actuator 520 provides electromechanical response around its rotation axis only.

Feedback Control Architecture

In order to operate the actuators in a closed loop format, feedback sensors are required. These sensors can be utilized either in the structure itself, or by external sensors (e.g., position sensing detector).

The present invention uses a combination of frequency and position sensing control schemes, to achieve a more precise and optimized operation of the mirror. The electrostatic drive actuation includes an integrated frequency sensor to obtain high signal-to-noise ratio and the electromagnetic drive actuation includes a position feedback design. The integration of the frequency sensor and the position feedback design provides true raster scanning. The frequency sensing of electrostatic actuator 520, can utilize the comb like fingers of stator 523 and rotor 521. The electromagnetic drive actuation includes position sensing detectors, which can be implemented as internal sensing in the design of the drive or external sensing element.

The Gimbaled Subsystem

Electrostatic actuator 520 actuates inner element of gimbaled subsystem 500, providing the scan across the horizontal axis, which is done at a relative high frequency, typically a few KHz. Electromagnet actuator 530 actuates outer annular element 525 of gimbaled subsystem 500, providing the scan across the vertical axis, which is done at a relative lower frequency, typically a few tens of Hz.

There is no or negligible mechanical coupling of the two degrees of freedom, i.e. electrostatic actuator 520 actuates only the inner element of gimbaled subsystem 500, and electromagnet actuator 530 actuates only the outer, annular element 525 of gimbaled subsystem 500.

Therefore, the foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A micro-electro-mechanical system device for actuating a gimbaled element, the device comprising:
   (a) an electromagnetic actuator for actuating a first angular degree of freedom (DOF) of rotation about the vertical axis; and
   (b) an electrostatic actuator for actuating a second angular DOF of rotation about the horizontal axis, wherein said horizontal axis and said vertical axis are orthogonal and coplanar,
   wherein the horizontal axis comprises an internal axis driven electrostatically and the vertical axis comprises an external axis driven electromagnetically, and
   wherein said electromagnetic actuator has a symmetric structure, which is symmetric with respect to the horizontal plane, thereby to define a plane of symmetry, and with respect to the vertical z axis, thereby to define an axis of symmetry, and which is operative for actuating forces produced by said electromagnetic actuator, to create only a rotational movement of said first DOF about said vertical axis, wherein the electromagnetic actuator's symmetric structure includes two pairs of magnet-assemblies, each individual pair from among said pairs comprising two magnets arranged symmetrically about the vertical axis and engaging top and bottom ends thereof.

2. The device of claim 1, wherein said electromagnetic actuator, excites negligible residual actuation force on said second DOF.

3. The device of claim 1, wherein said electrostatic actuator, uses electrostatic fringing fields, thereby creating an actuation force and defines coplanar electrodes including rotor and stator electrodes having the same potential,
   wherein the electrostatic actuator has a plane of symmetry which includes coplanar rotor and stator electrodes creating an attraction force therebetween which acts as a pure moment to yield torsional rotation of said horizontal axis.

4. The device of claim 3, wherein said electrostatic actuator has a symmetric structure, operative for actuating forces produced by said electrostatic actuator, to create only a rotational movement of said second DOF about said horizontal axis,
   wherein said coplanar rotor and stator electrodes are included in the electrostatic actuator's symmetric structure and create an attraction force therebetween which acts as a pure moment to yield torsional rotation of said horizontal axis,
   and wherein the electrostatic actuator's symmetric structure is symmetric with respect to the horizontal plane and with respect to the vertical axis.

5. The device of claim 4, wherein said electrostatic actuator, excites negligible residual actuation force on said first DOF.

6. The device of claim 3, wherein said electrostatic actuator has a sinusoidal electromechanical response.

7. The device of claim 1, wherein said electrostatic actuator, uses electrostatic fringing fields, thereby creating an actuation force and wherein there is no electrical potential difference between both sides of the structural material of said electrostatic actuator.

8. The device of claim 1, wherein said electrostatic actuator, actuates said second degree of freedom in the horizontal scan direction.

9. The device of claim 1, wherein said electromagnetic actuator, actuates said first degree of freedom in the vertical scan direction.

10. The device of claim 1, wherein said electromagnetic actuator, has a linear electromechanical response.

11. The device of claim 1, wherein said electrostatic actuator, comprises a frequency sensor with high signal to noise ratio.

12. The device of claim 1, wherein said electro-magnetic actuator has a symmetric structure, operative for actuating forces produced by said electro-magnetic actuator and for creating only a rotational movement of said second DOF about said horizontal axis,
   wherein the electro-magnetic actuator's symmetric structure includes two pairs of magnet-assemblies, each individual pair from among said pairs comprising two magnets arranged symmetrically about the horizontal axis and engaging top and bottom ends thereof.

13. A micro-electro-mechanical system device for actuating a gimbaled element, the device comprising:

(a) an electromagnetic actuator for actuating a first angular degree of freedom (DOF) of rotation about the vertical axis; and
(b) an electrostatic actuator for actuating a second angular DOF of rotation about the horizontal axis, wherein said horizontal axis and said vertical axis are orthogonal and coplanar, wherein the horizontal axis comprises an internal axis driven electrostatically and the vertical axis comprises an external axis driven electromagnetically, wherein said electromagnetic actuator comprises:
(a) external fixed electromagnet coils; and
(b) internal rotating magnets, thereby to define an electromagnetic subsystem,
and wherein the electromagnetic subsystem includes an electro-magnetic circuit, a ferromagnetic material, said coils, and said magnets, and is symmetrically located around the vertical axis, such that the electro-magnetic circuit, the ferromagnetic material, the coils, and the magnets each encompass the vertical axis.

14. The device of claim 13, wherein said rotating magnets are affixed to said vertical axis and actuated by said electromagnet coils.

15. The device of claim 13, wherein one or more of said electromagnetic actuators can be used on each side of said vertical axis.

16. The device of claim 13, wherein said electromagnetic actuator has a symmetric structure, which is symmetric with respect to the horizontal plane, thereby to define a plane of symmetry, and with respect to the vertical z axis, thereby to define an axis of symmetry, and which is operative for actuating forces produced by said electromagnetic actuator, to create only a rotational movement of said first DOF about said vertical axis, wherein the electromagnetic actuator's symmetric structure includes two pairs of magnet-assemblies, each individual pair from among said pairs comprising two magnets arranged symmetrically about the vertical axis and engaging top and bottom ends thereof.

17. The device of claim 16, wherein said electromagnetic actuator, excites negligible residual actuation force on said second DOF.

18. The device of claim 16, wherein said electromagnetic actuator, has a linear electromechanical response.

19. The device of claim 16, wherein said electro-magnetic actuator has a symmetric structure, operative for actuating forces produced by said electro-magnetic actuator and for creating only a rotational movement of said second DOF about said horizontal axis,
wherein the electro-magnetic actuator's symmetric structure includes two pairs of magnet-assemblies, each individual pair from among said pairs comprising two magnets arranged symmetrically about the horizontal axis and engaging top and bottom ends thereof.

20. The device of claim 13, wherein said electrostatic actuator, uses electrostatic fringing fields, thereby creating an actuation force and defines coplanar electrodes including rotor and stator electrodes having the same potential,
wherein the electrostatic actuator has a plane of symmetry which includes coplanar rotor and stator electrodes creating an attraction force therebetween which acts as a pure moment to yield torsional rotation of said horizontal axis.

21. The device of claim 20, wherein said electrostatic actuator has a symmetric structure, operative for actuating forces produced by said electrostatic actuator, to create only a rotational movement of said second DOF about said horizontal axis,
wherein said coplanar rotor and stator electrodes are included in the electrostatic actuator's symmetric structure and create an attraction force therebetween which acts as a pure moment to yield torsional rotation of said horizontal axis,
and wherein the electrostatic actuator's symmetric structure is symmetric with respect to the horizontal plane and with respect to the vertical axis.

22. The device of claim 21, wherein said electrostatic actuator, excites negligible residual actuation force on said first DOF.

23. The device of claim 20, wherein said electrostatic actuator has a sinusoidal electromechanical response.

24. The device of claim 13, wherein said electrostatic actuator, uses electrostatic fringing fields, thereby creating an actuation force and wherein there is no electrical potential difference between both sides of the structural material of said electrostatic actuator.

25. The device of claim 13, wherein said rotating magnets are affixed to said vertical axis and actuated by said electromagnet coils.

26. The device of claim 13, wherein one or more of said electromagnetic actuators can be used on each side of said vertical axis.

27. The device of claim 13, wherein said electrostatic actuator, actuates said second degree of freedom in the horizontal scan direction.

28. The device of claim 13, wherein said electromagnetic actuator, actuates said first degree of freedom in the vertical scan direction.

29. The device of claim 13, wherein said electrostatic actuator, comprises a frequency sensor with high signal to noise ratio.

30. A method for using a micro-electro-mechanical system device to actuate a gimbaled element, the method comprising:
(a) using an electromagnetic actuator for actuating a first angular degree of freedom (DOF) of rotation about the vertical axis; and
(b) using an electrostatic actuator for actuating a second angular DOF of rotation about the horizontal axis, wherein said horizontal axis and said vertical axis are orthogonal and coplanar, wherein the horizontal axis comprises an internal axis driven electrostatically and the vertical axis comprises an external axis driven electromagnetically, and
also comprising providing an electromagnetic actuator with a symmetric structure, which is symmetric with respect to the horizontal plane, thereby to define a plane of symmetry, and with respect to the vertical z axis, thereby to define an axis of symmetry, and which is operative for actuating forces produced by said electromagnetic actuator, to create only a rotational movement of said first DOF about said vertical axis, wherein the electromagnetic actuator's symmetric structure includes two pairs of magnet-assemblies, each individual pair from among said pairs comprising two magnets arranged symmetrically about the vertical axis and engaging top and bottom ends thereof.

* * * * *